United States Patent
Moeglein et al.

(10) Patent No.: US 9,491,680 B2
(45) Date of Patent: Nov. 8, 2016

(54) ASSISTANCE DATA CELL SELECTION BASED ON INTERFERENCE ESTIMATES IN A WIRELESS COMMUNICATIONS SYSTEM

(71) Applicant: QUALCOMM Incorporated, San Diego, CA (US)

(72) Inventors: Mark Leo Moeglein, Ashland, OR (US); Guttorm R. Opshaug, Redwood City, CA (US); Weihua Gao, San Jose, CA (US); Ferit Akgul, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/526,169

(22) Filed: Oct. 28, 2014

(65) Prior Publication Data

US 2016/0119851 A1    Apr. 28, 2016

(51) Int. Cl.
| | |
|---|---|
| H04W 36/00 | (2009.01) |
| H04W 36/32 | (2009.01) |
| H04W 36/30 | (2009.01) |
| H04W 52/28 | (2009.01) |
| H04W 64/00 | (2009.01) |
| G01S 5/10 | (2006.01) |
| H04W 4/02 | (2009.01) |

(52) U.S. Cl.
CPC ............ *H04W 36/32* (2013.01); *H04W 36/30* (2013.01); *H04W 52/285* (2013.01); *H04W 64/00* (2013.01); *G01S 5/10* (2013.01); *H04W 4/02* (2013.01)

(58) Field of Classification Search
CPC . H04W 36/32; H04W 36/30; H04W 52/285; H04W 64/00; H04W 4/02; G01S 5/10

USPC ........ 455/440, 63.1, 456.1, 456.6, 444, 447, 455/436, 442, 67.13
See application file for complete search history.

(56) References Cited

U.S. PATENT DOCUMENTS

| | | | | |
|---|---|---|---|---|
| 5,768,254 | A * | 6/1998 | Papadopoulos | H04B 7/005 370/201 |
| 5,946,612 | A * | 8/1999 | Johansson | H04W 16/18 455/405 |
| 7,123,928 | B2 * | 10/2006 | Moeglein | G01S 5/0236 455/404.2 |
| 8,059,700 | B2 * | 11/2011 | Lopez-Risueno | G01C 21/206 375/135 |
| 8,184,563 | B2 * | 5/2012 | Riley | G01S 5/0263 340/995.17 |
| 8,412,227 | B2 * | 4/2013 | Edge | G01S 5/0226 455/456.1 |

(Continued)

OTHER PUBLICATIONS

International Search Report and Written Opinion—PCT/US2015/055325—ISA/EPO—Feb. 1, 2016, 16 pgs.

*Primary Examiner* — Marceau Milord
(74) *Attorney, Agent, or Firm* — Blakely Sokoloff Taylor & Zafman LLP

(57) ABSTRACT

A method for assisting a mobile device to perform positioning measurements on positioning signals periodically transmitted by at least some of a plurality of cells in a wireless communication network includes determining an estimated position of the mobile device and then determining a first set of candidate cells of the plurality of cells based on the estimated position of the mobile device. The method also includes estimating an expected interference of each respective positioning signal that is transmitted by each candidate cell of the first set and selecting a subset of cells from the first set of candidate cells based on the estimated expected interference. Assistance data identifying the selected subset of cells is then generated and sent to the mobile device.

25 Claims, 5 Drawing Sheets

(56) References Cited

U.S. PATENT DOCUMENTS

| | | | |
|---|---|---|---|
| 8,532,567 B2* | 9/2013 | Moeglein | G01S 5/0236 342/357.21 |
| 8,570,993 B2* | 10/2013 | Austin | H04W 4/02 370/338 |
| 8,634,360 B2* | 1/2014 | Liu | H04W 74/008 370/329 |
| 8,725,167 B2* | 5/2014 | Siomina | G01S 5/0036 455/456.1 |
| 8,750,808 B2* | 6/2014 | Kazmi | G01S 5/0205 455/452.1 |
| 8,917,209 B2* | 12/2014 | Krasner | G01S 19/11 342/386 |
| 8,918,103 B2* | 12/2014 | Mayor | G01S 5/14 370/328 |
| 8,942,725 B2* | 1/2015 | Marti | G01S 5/0252 455/456.1 |
| 8,977,298 B2* | 3/2015 | Marti | G01S 5/0252 370/328 |
| 9,020,523 B2* | 4/2015 | Moeglein | G01S 5/0205 370/338 |
| 9,119,165 B2* | 8/2015 | Krasner | G01S 19/11 |
| 2010/0323718 A1 | 12/2010 | Jen | |
| 2011/0105144 A1 | 5/2011 | Siomina et al. | |
| 2012/0040687 A1 | 2/2012 | Siomina et al. | |
| 2012/0040696 A1 | 2/2012 | Siomina et al. | |
| 2012/0122440 A1 | 5/2012 | Krishnamurthy et al. | |
| 2012/0142373 A1 | 6/2012 | Kazmi et al. | |
| 2012/0165053 A1 | 6/2012 | Yoon et al. | |
| 2012/0184302 A1 | 7/2012 | Kazmi et al. | |
| 2013/0301451 A1 | 11/2013 | Siomina et al. | |
| 2013/0316727 A1* | 11/2013 | Edge | H04W 4/02 455/456.1 |
| 2014/0162688 A1* | 6/2014 | Edge | H04W 8/005 455/456.1 |
| 2014/0235266 A1 | 8/2014 | Edge et al. | |
| 2015/0223085 A1* | 8/2015 | Siomina | H04W 52/0206 370/252 |
| 2015/0341077 A1* | 11/2015 | Krasner | G01S 19/13 375/142 |

\* cited by examiner

ASSISTANCE DATA CELL SELECTION BASED ON INTERFERENCE ESTIMATES IN A WIRELESS COMMUNICATIONS SYSTEM

TECHNICAL FIELD

This disclosure relates generally to mobile communications and, in particular but not exclusively, relates to the generation of assistance data used to determine the position of wireless mobile stations in a mobile communications network.

BACKGROUND INFORMATION

The position of a mobile station, such as, for example, a cellular telephone, may be estimated based on information gathered from various systems. One such system may comprise the Global Positioning System (GPS), which is one example of a satellite positioning system (SPS). SPS systems such as GPS may comprise a number of space vehicles (SV) orbiting the earth. Another example of a system that may provide a basis for estimating the position of a mobile station is a cellular communication system comprising a number of aerial and/or terrestrial base stations to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. Such transmitters may comprise SVs in the case of an SPS and/or terrestrial base stations in the case of a cellular communications system, for example. Ranges to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters.

In a Code Division Multiple Access (CDMA) digital cellular network, the position location capability can be provided by Advanced Forward Link Trilateration (AFLT). In Wideband Code Division Multiple Access (WCDMA) and Long Term Evolution (LTE) networks the position location capability is provided by Observed Time Difference Of Arrival (OTDOA). These techniques compute the location of the mobile station (MS) from the mobile station's measured time of arrival of radio signals from the base stations. A more advanced technique is hybrid position location, where the mobile station employs a Global Positioning System (GPS) receiver and the position is computed based on both AFLT (or OTDOA) and GPS measurements.

LTE OTDOA positioning technology uses Positioning Reference Signals (PRS) to measure Time Of Arrival (TOA) from each neighboring cell in order to calculate OTDOA position fix. The accuracy of OTDOA position fix depends on accuracy of individual PRS measurements and the number of measured neighbor cells. In order to be able to measure the PRS signals from the serving cell and neighbor cells, user equipment (UE), or mobile device, sends an Assistant Data Request to an OTDOA system server. The Server will then send a suite of cells' information (e.g., BSA and Timing info) to the UE. Usually, for UE on a single frequency, the server can send the information of one serving cell plus up to 24 neighbor cells. Some conventional location server systems include fairly rudimentary logic for selecting neighbor cells to be included in the OTDOA Assistance data. For example, some systems use the pre-fix position of the UE, find all the neighbor cells within certain distance (say 50 km), and then select whatever cells appear first in the list.

However, due to the PRS pattern in LTE and the carrier's site plan, there is a good chance that among the selected neighbor cells, some of them will have strong interference to or from the serving cell which makes them poor choices for OTDOA positioning purposes.

BRIEF SUMMARY

Accordingly, embodiments of the present disclosure include utilizing a priori interference estimates in the generation of assistance data in order to select the cells that are most likely to be seen by the mobile device, given a serving coverage area in which the mobile device is likely to be.

For example, according to one aspect of the present disclosure, a method for assisting a mobile device to perform positioning measurements in a wireless communication network includes determining an estimated position of the mobile device and then determining a first set of candidate cells in the wireless communication network based on the estimated position of the mobile device. The method also includes estimating an expected interference of each respective positioning signal that is transmitted by each candidate cell of the first set and then selecting a subset of cells from the first set of candidate cells based on the estimated expected interference. Assistance data identifying the subset of cells is then generated and sent to the mobile device.

According to another aspect of the present disclosure, a non-transitory computer-readable medium includes program code stored thereon for assisting a mobile device to perform positioning measurements on positioning signals transmitted by a wireless communication network. The program code includes instructions to determine an estimated position of the mobile device and in response thereto determine a first set of candidate cells of the plurality of cells. Instructions are further included to estimate an expected interference of each respective positioning signal that is transmitted by each candidate cell of the first set and then select a subset of cells from the first set of candidate cells based on the estimated expected interference. The instructions then include generating assistance data that indentifies the selected subset of cells and then sending the generated assistance data to the mobile device.

An apparatus, such as a location server, is provided in another aspect of the present disclosure. The apparatus includes memory adapted to store program code for assisting a mobile device to perform positioning measurements in the wireless communication network. When instructions included in the program code are executed by a processing unit included in the apparatus, the apparatus is configured to determine an estimated position of the mobile device and then determine a first set of candidate cells of the plurality of cells in the wireless communication network based on the estimated position of the mobile device. The apparatus is further configured to estimate an expected interference of each respective positioning signal that is transmitted by each candidate cell of the first set and to select a subset of cells from the first set of candidate cells based on the estimated expected interference. The apparatus then generates assistance data that indentifies the selected subset of cells and sends the generated assistance data to the mobile device.

In a further aspect of the present disclosure, a location server is provided that is to be used with a Long Term Evolution (LTE) wireless communication system that includes a plurality of cells. The cells are configured to periodically transmit a Position Reference Signal (PRS) for Observed Time Difference Of Arrival (OTDOA) positioning of a mobile device within the LTE wireless communication system. The location server is configured to receive a request for assistance data from the mobile device via a serving cell of the plurality of cells. The location server then determines an estimated position of the mobile device in response to receiving the request for assistance data and a first set of candidate cells based on the estimated position of the mobile device. The location server is also configured to estimate an expected interference of each respective positioning signal that is transmitted by each candidate cell of the first set and to select a subset of cells from the first set of candidate cells based on the estimated expected interference. The location server then generates assistance data that includes a Physical Cell ID (PCI) for each cell included in the selected subset of cells and sends the generated assistance data to the mobile device.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Reference throughout this specification to "one embodiment", "an embodiment", "one example", or "an example" means that a particular feature, structure, or characteristic described in connection with the embodiment or example is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

Figure 1:
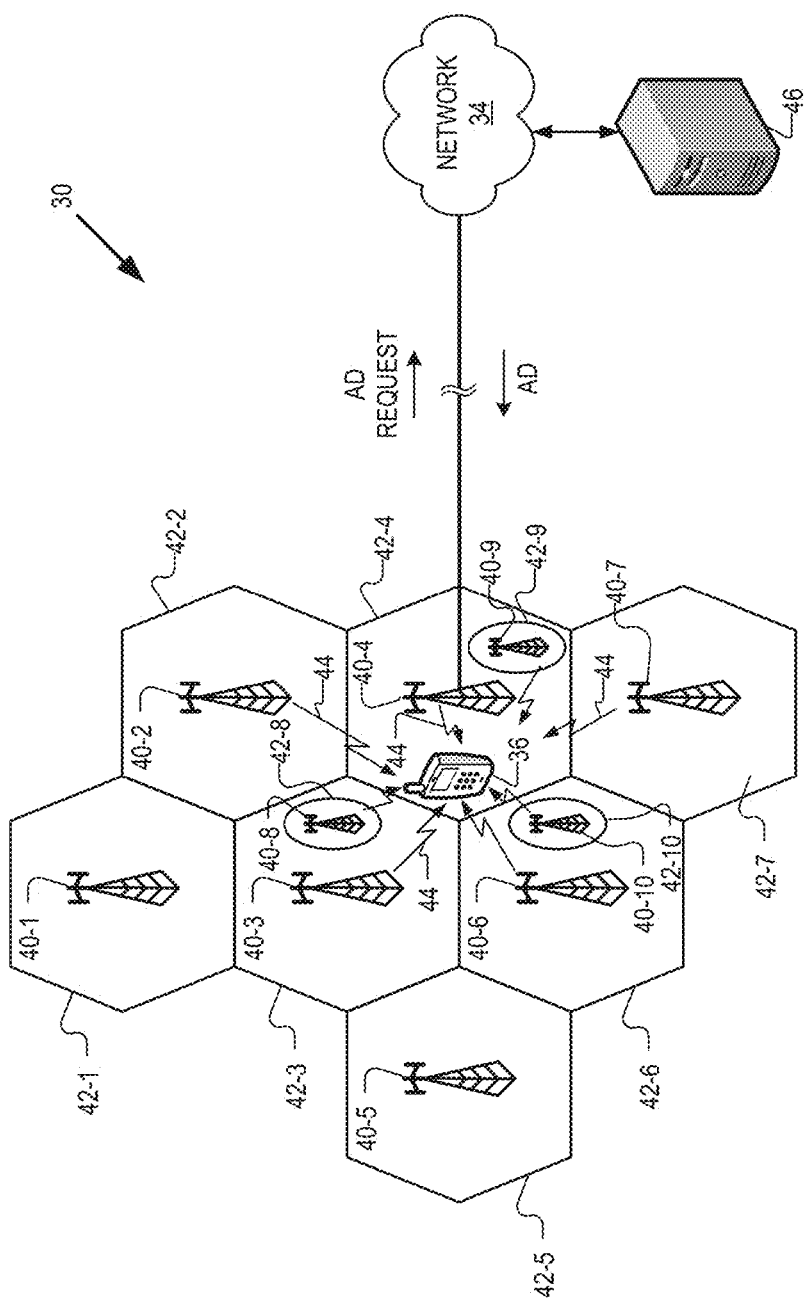
FIG. 1 is a functional block diagram of an example wireless communication system.

FIG. 1 illustrates an example wireless communication system 30 according to one or more embodiments. As shown, system 30 includes a network of cells 42, a network 34, a location server 46, and one or more wireless devices 36. The cells 42 and network 34 enable mobile device 36 to access one or more external networks (not shown), such as the Public Switched Telephone Network (PSTN) or the Internet.

Each cell 42 includes at least one base station 40. The base stations 40 are geographically distributed across the wide geographic area served by the system 30. Each base station 40 provides wireless coverage for one or more respective portions of that geographic area, referred to as cells 42. Because of this, mobile device 36 may move within or between cells 42 and may communicate with one or more base stations 40 at any given position.

Different cells 42 may have different nominal sizes, depending on the maximum transmit power utilized by the base stations 40 serving those cells 42. For example, base station 40-1 may have a relatively large maximum transmit power and correspondingly serves wireless devices within a relatively large cell 42-1, while base station 40-8 may have a relatively small maximum transmit power and correspondingly serves wireless devices within a relatively small cell 42-8. In general, different base stations 40 that have different pre-defined maximum transmit powers (and thereby serve cells 42 of different nominal sizes) belong to different base station classes (e.g., a macro base station class, a micro base station class, a pico base station class, etc.).

As shown in FIG. 1, mobile device 36, at its current position, is served by base station 40-4 in the sense that the mobile device 36 exchanges data with base station 40-4. Base station 40-4 transmits this data to mobile device 36 on a particular frequency (referred to as the serving cell frequency) and over a particular bandwidth (known as the serving-cell bandwidth). Thus, from the perspective of mobile device 36, base station 40-4 is the serving base station and cell 42-4 is the serving cell. Other cells 42 that are geographically adjacent to or partially coincident with the serving cell 42-4 are referred to as neighboring cells. In this example, all cells 42 shown are neighboring cells except for cells 40-1 and 40-5.

Each of the cells 42 (via its base station 40) periodically transmits a positioning signal 44. A positioning signal 44 is a predetermined signal that is known to both a cell 42 transmitting that signal and, with the aid of assistance data provided by location server 46, by mobile device 36 receiving the signal. The positioning signal 44 may be transmitted by a cell 42 on the same or a different frequency as the serving cell frequency. Positioning signals 44 transmitted by the cells 42 in this way can be measured and used by mobile device 36 to determine a location of the mobile device 36. The positioning signal measurements can be used for various purposes, including for example mobility management or determining the geographic position of the mobile device 36.

In one embodiment, mobile device 36 may communicate with location server 46 on network 34 for accomplishing such a purpose. This communication between mobile device 36 and location server 46 may include one or more transactions between mobile device 36 and location server 46. Each transaction pertains to a particular operation, such as the exchange of capabilities, the transfer of assistance data from the server 46 to the device 36 for assisting the device 36 to perform positioning signal measurements, or the transfer of information concerning the ultimate purpose of those measurements (e.g., the actual position of mobile device 36).

When attempting to determine its position, mobile device 36 may measure positioning signals 44 transmitted from multiple different cells 42. If all of these cells 42 transmit positioning signals 44 over the serving frequency, then cells 42 may be measured at the same time during the measurement session. But, if different cells 42 transmit positioning signals over different non-serving frequencies, those cells 42 may need to be measured at different times during the measurement session.

Figure 2A:
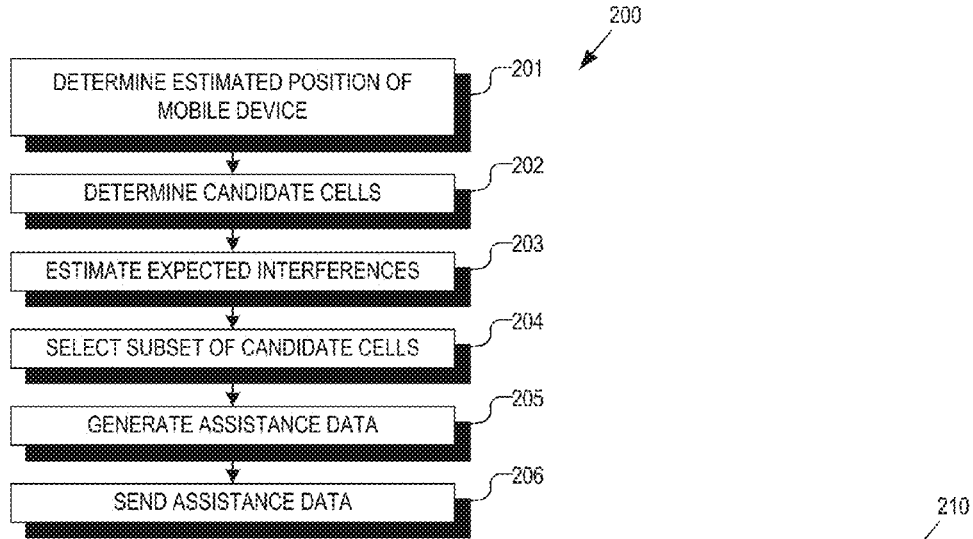
FIG. 2A is a flowchart illustrating a process of assisting a mobile device to perform positioning measurements in a wireless communications system.

FIG. 2A is a flowchart illustrating a process 200 of assisting a mobile device (e.g., mobile device 36) to perform positioning measurements in a wireless communications system (e.g, system 30). In one aspect, process 200 is a process of determining the likelihood of a PRS (Positioning Reference Signal) signal (e.g., signal 44) being available at a mobile device. As will be described below, process 200 includes one or more link analyses to determine a link margin where this link margin can then be converted to a likelihood, assuming a Gaussian distribution of unknown but characterizable losses between the cell antenna and the mobile antenna. The likelihood of availability is then scaled down in situations where the physical cell ID (PCI) is ambiguous, according to the level of ambiguity. Thus, process 200 may be summarized as follows: (1) determine the expected signal strength; (2) determine expected interference from serving cell (and other members of the active set, when available) to increase the noise floor, as necessary; and (3) determine the likelihood of an ambiguity at any point within the serving cell coverage area and scale down expected availability accordingly.

In the example of FIG. 2A, process 200 begins at process block 201, where the location server determines an estimated position of the mobile device. In one aspect, the position estimation of process block 212 can proceed in a manner very similar to an IS-801 pre-fix. For example, to the extent appropriate data are available, the initial position estimate will fall into one of the following three categories: Category 1, where the serving power levels of the serving cell are unknown; Category 2, where the serving power levels of the serving cell are known, but the serving power levels of other active cells are unknown; and Category 3, wherein the serving power levels of the serving cell and of other active cells are known.

Now having the estimated position of the mobile device within the mobile network, process 200 proceeds to process block 202 where a first set of candidate cells are determined. In one aspect, creating the first set of candidate cells includes determining whether a distance between the estimated position of the mobile device and a cell's base station is within a threshold distance. If the distance is within the threshold distance and if the estimated position of the mobile device is within a maximum antenna range (MAR) of the respective base station then the candidate cell is added to the first set. In one embodiment, the number of candidate cells in the first set should be sufficient to capture all potential transmitters that might be selected, typically 75 or more candidates, for the smallest distance/MAR. In one example, if the number of candidate cells in the first set is less than a threshold number of candidates (e.g., 75), then the threshold distance can be increased.

Next, in process block 203 the expected interferences are estimated. In one aspect, the expected interferences are the expected interferences of each respective positioning signal that would be transmitted by a candidate cell to the mobile device at its estimated position. In some wireless communications systems, the number of distinct frequencies on which the positioning signals are transmitted is limited and thus positioning signals transmitted by different cells are often transmitted on the same frequency. By way of example, LTE OTDOA positioning technology allows for only six distinct frequencies on which to transmit Positioning Reference Signals (PRS). Thus, the transmit frequency of the PRS repeats itself in a period of six, so the cells which have the same transmit frequency for PRS (e.g., PCI MOD 6) will strongly interfere with one another. Accordingly, embodiments of the present process use the repeating positioning signal transmit frequencies to set different noise levels for different cells to allow for better selection of the neighbor cells to be included in the assistance data.

As with position estimation, interference estimation depends upon how much is known at the beginning of the process. For example, to the extent appropriate data are available, the interference estimates will fall into one of the following three categories: Category 1, where the serving power levels of the serving cell are unknown; Category 2, where the serving power levels of the serving cell are known, but the serving power levels of other active cells are unknown; and Category 3, wherein the serving power levels of the serving cell and of other active cells are known.

Next, in process block 204, a subset of candidate cells are selected based, at least, on the estimated expected interferences. As will be described in further detail below, the candidate cells may be scored where the cells with the highest score are added to the assistance data (e.g., process block 205) and sent to the mobile device (e.g., process block 206) for use in positioning signal measurements.

Figure 2B:
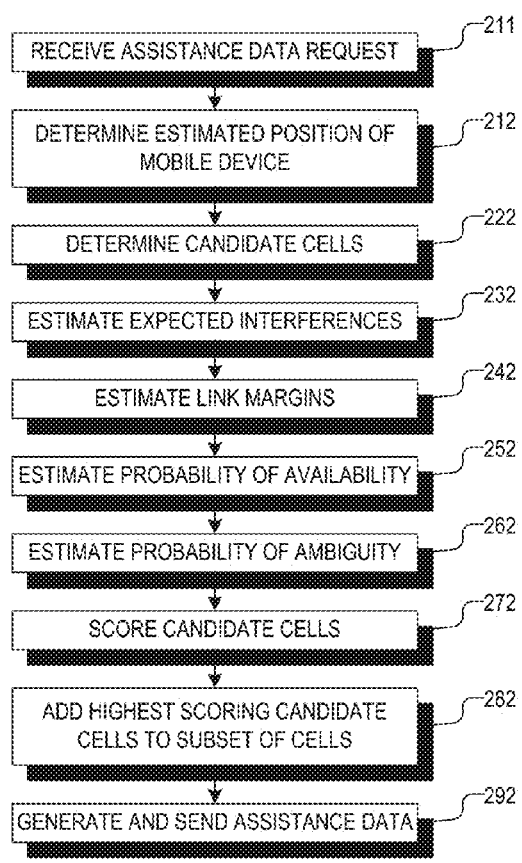
FIG. 2B is a flowchart illustrating further detail of the process of FIG. 2A.

FIG. 2B is a flowchart illustrating a process 210 of assisting a mobile device to perform positioning measurements in a wireless communications system. Process 210 is one possible implementation of process 200 of FIG. 2A. In the specific example of FIG. 2B, process 210 begins at process block 211, where a location server (e.g., location server 46) receives an Assistance Data (AD) request from a mobile device. Next, in process block 212, the location server determines a estimated position of the mobile device. In one aspect, the position estimation of process block 212 can proceed in a manner very similar to an IS-801 pre-fix. For example, to the extent appropriate data are available, the initial position estimate will fall into one of the following three categories: Category 1, where the serving power levels of the serving cell are unknown; Category 2, where the serving power levels of the serving cell are known, but the serving power levels of other active cells are unknown; and Category 3, wherein the serving power levels of the serving cell and of other active cells are known.

Figure 2C:
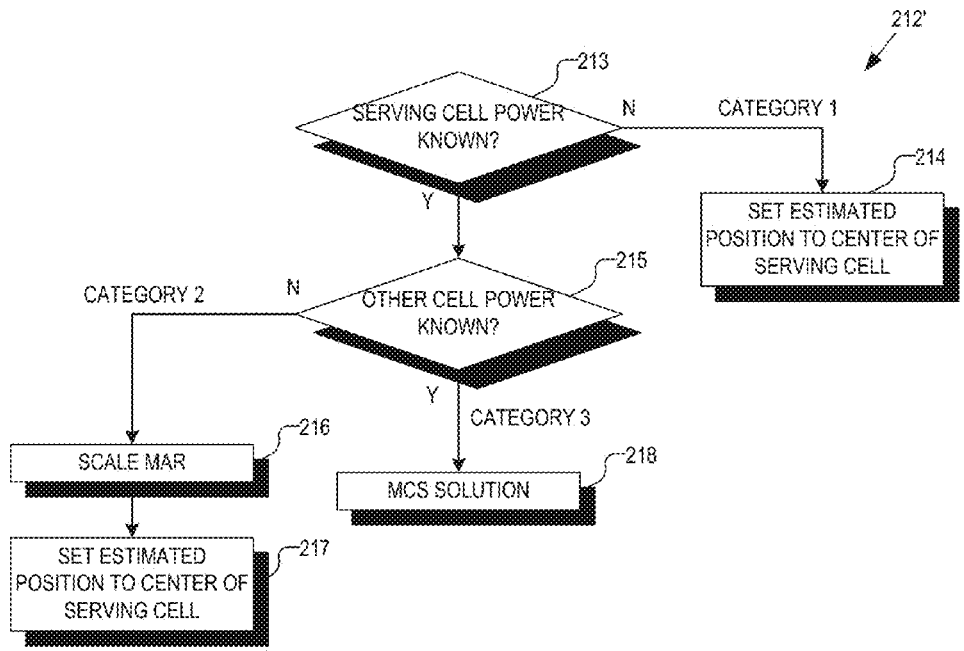
FIG. 2C is a flowchart illustrating a process of determining an estimated position of a mobile device in a wireless communications system.

FIG. 2C is a flowchart illustrating a process 212' of determining an estimated position of a mobile device in a wireless communications system depending on the information available to the location server. Process 212' is one possible implementation of process block 212 of FIG. 2B. As shown in FIG. 2C, process 212' may begin at decision block 213 where it is determined whether serving power levels of the serving cell are known. If not, then process 212' proceeds to process block 214. Process block 214 is representative of a Category 1 initial position estimate, where the initial position is set to the geographic center of the serving cell.

If however, in decision block 213, it is determined that the serving power levels of the serving cell are indeed known, then process 212' proceeds to decision block 215 to determine whether the serving power levels of other active cells are also known. If not, then only the serving power levels of the serving cell are known and process 212' proceeds to process block 216 to begin a Category 2 initial position estimate. In process block 216 the estimated maximum antenna range (e.g., Maximum Antenna Range (MAR)) of the serving base station is scaled according to the known relative power of the serving cell. Using this scaled down MAR, process block 217 then sets the estimated position of the mobile device to the center of the serving cell.

If both the power levels of the serving cell are known and the power levels of other active cells in the system are known, then decision block 215 advances to process block 218, which represents a Category 3 initial position estimate. In process block 218, the location server performs a Mixed Cell Sector (MCS) solution using the known relative power levels of the serving cell and other active cells. In one embodiment, the MCS solution includes RSRP, RSSI, and/or TA measurements from multiple cells to narrow down the initial estimate of the mobile device position.

Returning now to FIG. 2B, now having the estimated position of the mobile device within the mobile network, process 210 proceeds to process block 222 where a first set of candidate cells are determined. In one aspect, creating the first set of candidate cells includes determining whether a distance between the estimated position of the mobile device and a cell's base station is within a threshold distance. If the distance is within the threshold distance and if the estimated position of the mobile device is within a maximum antenna range (MAR) of the respective base station then the candidate cell is added to the first set. In one embodiment, the number of candidate cells in the first set should be sufficient to capture all potential transmitters that might be selected, typically 75 or more candidates, for the smallest distance/MAR. In one example, if the number of candidate cells in the first set is less than a threshold number of candidates (e.g., 75), then the threshold distance can be increased.

Next, in process block 232 the expected interferences are estimated. In one aspect, the expected interferences are the expected interferences of each respective positioning signal that would be transmitted by a candidate cell to the mobile device at its estimated position. In some wireless communications systems, the number of distinct frequencies on which the positioning signals are transmitted is limited and thus positioning signals transmitted by different cells are often transmitted on the same frequency. By way of example, LTE OTDOA positioning technology allows for only six distinct frequencies on which to transmit Positioning Reference Signals (PRS). Thus, the transmit frequency of the PRS repeats itself in a period of six, so the cells which have the same transmit frequency for PRS (e.g., PCI MOD 6) will strongly interfere with one another. Accordingly, embodiments of the present process use the repeating positioning signal transmit frequencies to set different noise levels for different cells to allow for better selection of the neighbor cells to be included in the assistance data.

As with position estimation, interference estimation depends upon how much is known at the beginning of the process. For example, to the extent appropriate data are available, the interference estimates will fall into one of the following three categories: Category 1, where the serving power levels of the serving cell are unknown; Category 2, where the serving power levels of the serving cell are known, but the serving power levels of other active cells are unknown; and Category 3, wherein the serving power levels of the serving cell and of other active cells are known.

In one aspect, all non-impacted candidate cells will have their threshold sensitivity set at first fixed level (e.g., −124 dBm). Impacted cells (those having the same positioning signal transmit frequency as the serving sector or any other known candidate cells) will have their threshold sensitivity set according to one of the above-mentioned three categories of interference estimates.

Figure 2D:
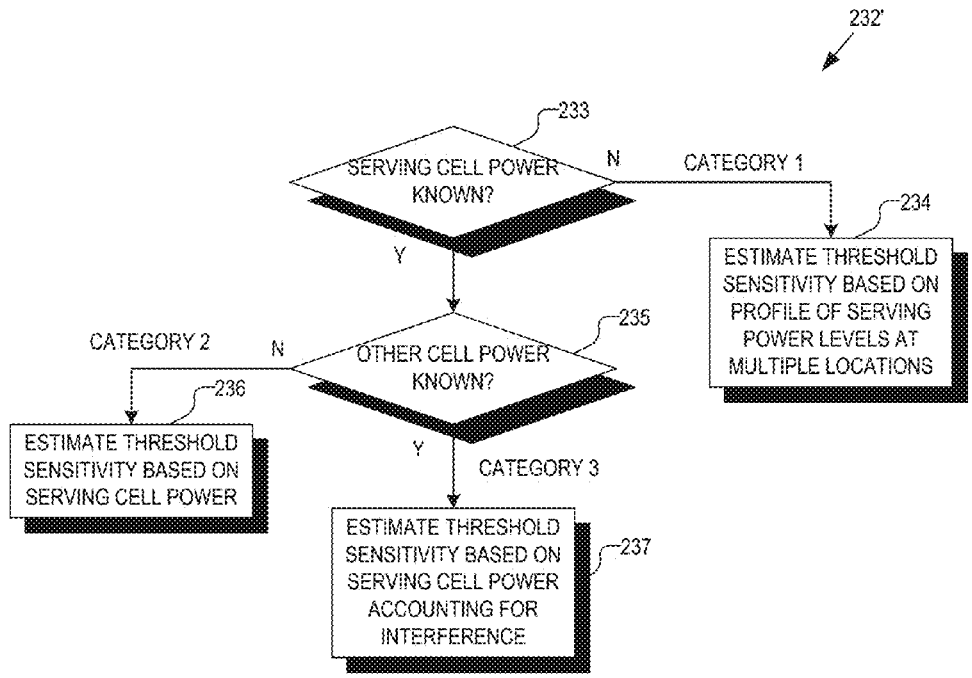
FIG. 2D is a flowchart illustrating a process of estimating an expected interference for positioning signals in a wireless communications system.

FIG. 2D is a flowchart illustrating a process 232' of estimating an expected interference for positioning signals from impacted cell in a wireless communications system. Process 232' is one possible implementation of process block 232 of FIG. 2B. As shown in FIG. 2D, process 232' may begin at decision block 233 where it is determined whether serving power levels of the serving cell are known. If not, then process 232' proceeds to process block 234. Process block 234 is representative of a Category 1 interference estimate, where, for impacted cells, the threshold sensitivity at multiple serving power levels is estimated. The serving power levels used may be those nominally associated with the locations within the serving cell that are used for this analysis. For example, the serving power levels may be −74 dBm (cell center), −80 dBm (cell edges) and −94 dBm (cell backside and 0.9 MAR). Continuing with this embodiment, the resultant noise floor would be set to −104 dBm, −110 dBm, and −124 dBm, respectively for each of these locations.

If however, in decision block 233, it is determined that the serving power levels of the serving cell are indeed known, then process 232' proceeds to decision block 235 to determine whether the serving power levels of other active cells are also known. If not, then only the serving power levels of the serving cell are known and process 232' proceeds to process block 236 to begin a Category 2 interference estimate. In process block 236 the threshold sensitivity on those candidate cells with the same positioning signal transmit frequency as the serving cell are estimated. In one example, the interference sets the threshold sensitivity at 30 dB below the serving power level, accounting for code orthogonality. Also, the threshold sensitivity for the serving cell may be set to −124 dBm.

If both the power levels of the serving cell are known and the power levels of other active cells in the system are known, then decision block 235 advances to process block 237, which represents a Category 3 interference estimate. In process block 237, for each cell having the same positioning signal transmit frequency, the location server finds the strongest signal and estimates a threshold sensitivity on those candidate cells with matching positioning signal transmit frequency values at 30 dB below the reported power level. The threshold sensitivity for all candidates in the active set (serving and neighbor) may then be set to −124 dBm.

In one embodiment, the location server may allow for the use of the maximum expected power level on each MOD 6 value to set the noise floor for all candidates of that MOD 6 value. Continuing with this example, all cells with maximum expected power level on a given MOD 6 value should have their thresholds set to the standard threshold sensitivity (−124 dBm by default).

Returning now to FIG. 2B, now with the estimated expected interferences, process 210 proceeds to process block 242 where link analysis is performed. In one embodiment, analysis is performed at multiple (e.g., five) different locations within the serving cell rather than just at the cell center. The expected power for each candidate cell is determined at each of these locations. The signal margin is determined by taking the difference between expected power and the threshold sensitivity for each candidate cell, determined above.

In one aspect, each candidate cell's estimated signal strength SSi is dependent upon its range to the nominal mobile position of interest, its MAR value, and its antenna gain. The range determines path loss. In one example, embodiments discussed herein utilize an $R^4$ path loss by default. MAR value is used to normalize between large and small cells. The MAR value may be increased, to account for the sensitivity for PRS vs. for serving. In one embodiment, a nominal −32 dB Ec/Io sensitivity, as in AFLT, is assumed, such that the AFLT scaling function may be utilized. In one example, the AFLT scaling function is given by the following equation:

$$SFmar = 1-(EcIo+15)*0.045 \qquad \text{EQ(1)}$$

Thus, utilizing equation 1, the candidate cell MAR values are all scaled by 1.765, by default.

Antenna gain may be read from a look-up table based upon the orientation and opening of the cell antenna and the look-angle to the nominal mobile position. Key equations for antenna gain, path loss and overall candidate signal strength:

$$Lai = Ga(\phi_i) \qquad (2),$$

where $\phi_i$ is the azimuthal offset between the candidate cell antenna's orientation and the pointing vector towards the hypothetical mobile position.

$$Lpi = 10*\log 10\left(\frac{4*Ri}{0.3*MARi}\right), \qquad \text{EQ (3)}$$

where Lpi is the relative candidate path loss, Ri is the range to the mobile device from the candidate cell and MARi is the candidate scaled MAR.

$$SSi = SSf + Lai + Lpi, \qquad \text{EQ(4)},$$

where SSi is the candidate cell's expected signal strength, SSf is the expected signal strength at 0.3MARi (unsealed MAR) from the face of the antenna, nominally set to −74 dBm by default.

$$SMi = SSi - THRESHOLDi, \qquad \text{EQ(5)},$$

where $THRESHOLD_i$ is the candidate cell's interference-based sensitivity threshold.

Process 210 may then estimate the probability of availability of a candidate cell's positioning signal, by converting the estimated signal margin to a probability. In one embodiment, the probability of candidate cell's positioning signal availability is determined, by default, from the Gaussian CDF function, as stored in a look-up table. An error value according to equation 6 can be determined:

$$Zi = (SMi - \mu)/\sigma \qquad \text{EQ(6)}$$

where SMi is signal margin for each candidate cell, $\mu$ is mean uncontrolled signal attenuation associated with the mobile environment and $\sigma$ is the variation of that signal attenuation about the mean. In one embodiment, $\mu=15$ dB and $\sigma=10$ dB. The error value Zi is then input into the lookup table to obtain a probability value Pi.

Ambiguities occur when the location server and mobile device cannot distinguish between signals from two different cell antennas using the same PCI. The location server then estimates the potential for this ambiguity (e.g., process block 262) on each candidate cell's PCI and, in ambiguous cases, quantify the fraction of the serving coverage area that would be impacted.

In one embodiment, the region of potential ambiguity is given by equation 7 as follows:

$$abs(R2-R1) < (1+\cos(\theta))*Up \qquad \text{EQ(7)}$$

where $U_p$ is the 3-sigma horizontal position uncertainty (typically scaled MAR) and R2 and R1 are the respective candidate cell ranges to the estimated position of the mobile device. $\theta$ is the angle between the two R vectors. When a candidate cell is potentially ambiguous, the fraction of the uncertainty area, f is given by:

$$fi = \frac{abs(R2-R1)}{1+\cos(\theta)} * Up. \qquad \text{EQ (8)}$$

The probability score, Pi, formed with the signal margin from the link analysis is then scaled to get a final measurement availability estimate: Ai=Pi*fi. In one embodiment the availability estimate Ai is used to score the candidate cells, as in process block 272. The candidate cells with the highest score (e.g., Ai) may then be added to the assistance data and sent to the mobile device (e.g., process block 292) for use in positioning signal measurements. In one embodiment, the assistance data is generated includes an identification (e.g., Physical Cell ID (PCI)) of each cell included in the selected set of candidate cells. In addition to identifying each selected candidate cell, the generated assistance data may also include timing information of each selected candidate cell. For example, the generated assistance data may further include PRS configuration info for each selected candidate cell for the OTDOA.

As used herein, the term "mobile station" (MS) or mobile device refers to a device that may from time to time have a position location that changes. The changes in position location may include changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also include a processor and/or computing platform adapted to perform functions controlled by machine-readable instructions.

Figure 3:
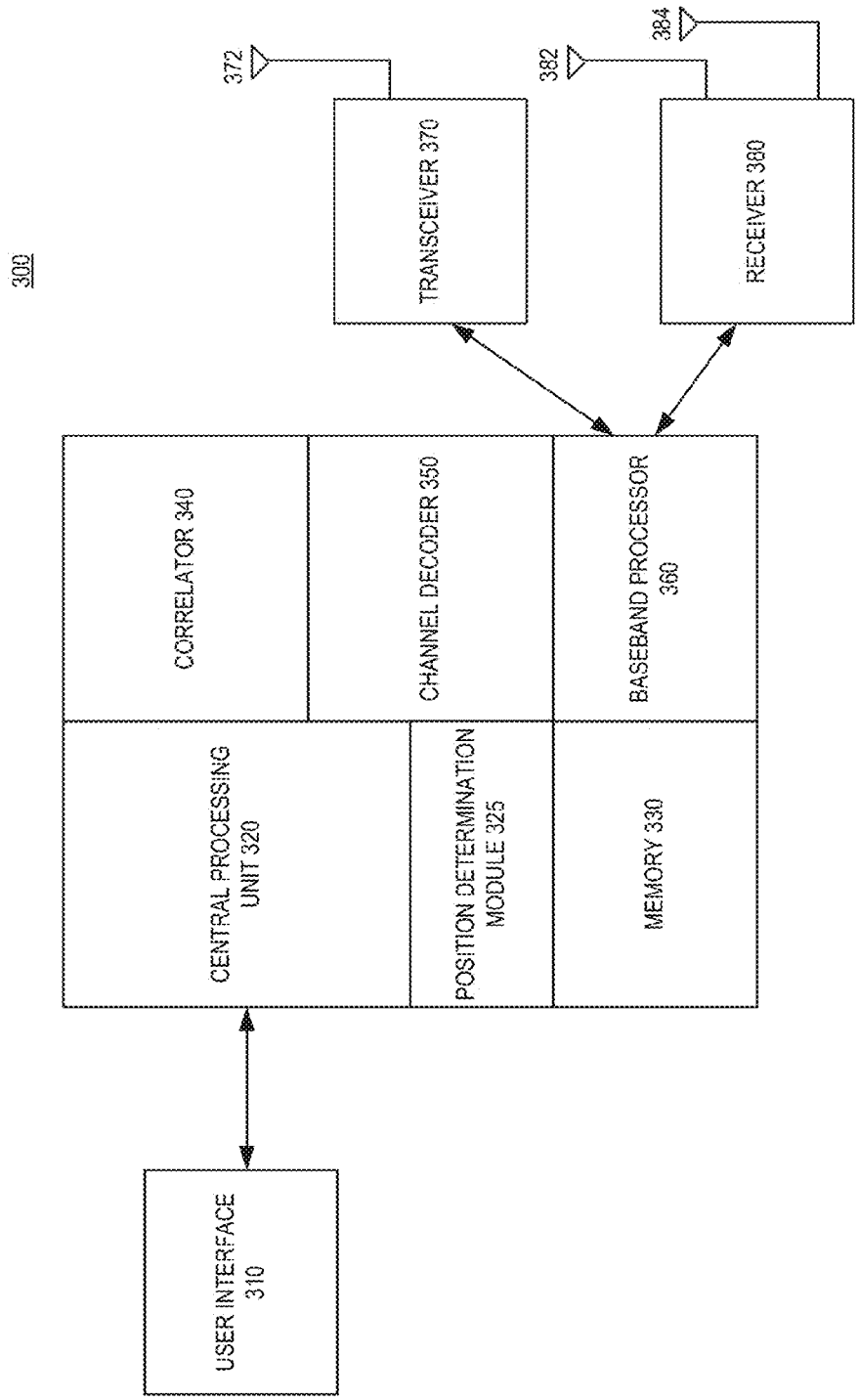
FIG. 3 is a functional block diagram of an example mobile station.

For example, FIG. 3 is a block diagram of an example of mobile device 300 that may be adapted to perform any of the example techniques described herein in connection with FIGS. 1 and 2A-2D. One or more radio transceivers 370 may be adapted to modulate an RF carrier signal with baseband information, such as voice or data, onto an RF carrier, and demodulate a modulated RF carrier to obtain such baseband information. An antenna 372 may be adapted to transmit a modulated RF carrier over a wireless communications link and receive a modulated RF carrier over a wireless communications link. In one embodiment antenna 372 is adapted to send assistance data requests and receive assistance data from a base station, such as base station 40-4 of FIG. 1.

A baseband processor 360 may be adapted to provide baseband information from a central processing unit (CPU) 320 to transceiver 370 for transmission over a wireless communications link. Here, CPU 320 may obtain such baseband information from an input device within a user interface 310. Baseband processor 360 may also be adapted to provide baseband information from transceiver 370 to CPU 320 for transmission through an output device within user interface 310.

User interface 310 may comprise a plurality of devices for inputting or outputting user information such as voice or data. Such devices may include, by way of non-limiting examples, a keyboard, a display screen, a microphone, and a speaker.

A receiver 380 may be adapted to receive and demodulate transmissions from an SPS, and provide demodulated information to correlator 340. Correlator 340 may be adapted to derive correlation functions from the information provided by receiver 380. Correlator 340 may also be adapted to derive pilot-related correlation functions from information relating to pilot signals provided by transceiver 370. This information may be used by a mobile device to acquire wireless communications services. Channel decoder 350 may be adapted to decode channel symbols received from baseband processor 360 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 350 may comprise a turbo decoder.

A memory 330 may be adapted to store machine-readable instructions which are executable to perform one or more of processes, implementations, or examples thereof which are described or suggested herein. CPU 320 may be adapted to access and execute such machine-readable instructions.

Mobile device 300 also includes a position determination module (PDM) 325 that is configured to perform positioning signal measurements and/or assistance data processing. In one example, PDM 325 is configured to generate assistance data requests and to transmit such requests to a base station via transceiver 370. In another example, PDM 325 processes assistance data received via transceiver 370. In yet another example PDM 325 may perform the measurements of one or more positioning signals and determine a position of mobile device 300 in response thereto. PDM 325 and Processing unit 320 are illustrated separately for clarity, but may be a single unit.

Processing unit 320, as well as one or more of the PDM 325, correlator 340, channel decoder 350, and baseband processor 360 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with mobile device 300, and is not to be limited to any particular type of memory or number of memories, or type of media upon which memory is stored.

The processes described herein may be implemented by various means depending upon the application. For example, these processes may be implemented in hardware, firmware, software, or any combination thereof. For a hardware implementation, the processing unit 320 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 330 and executed by the processing unit 320. Memory 330 may be implemented within or external to the processing unit 320.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
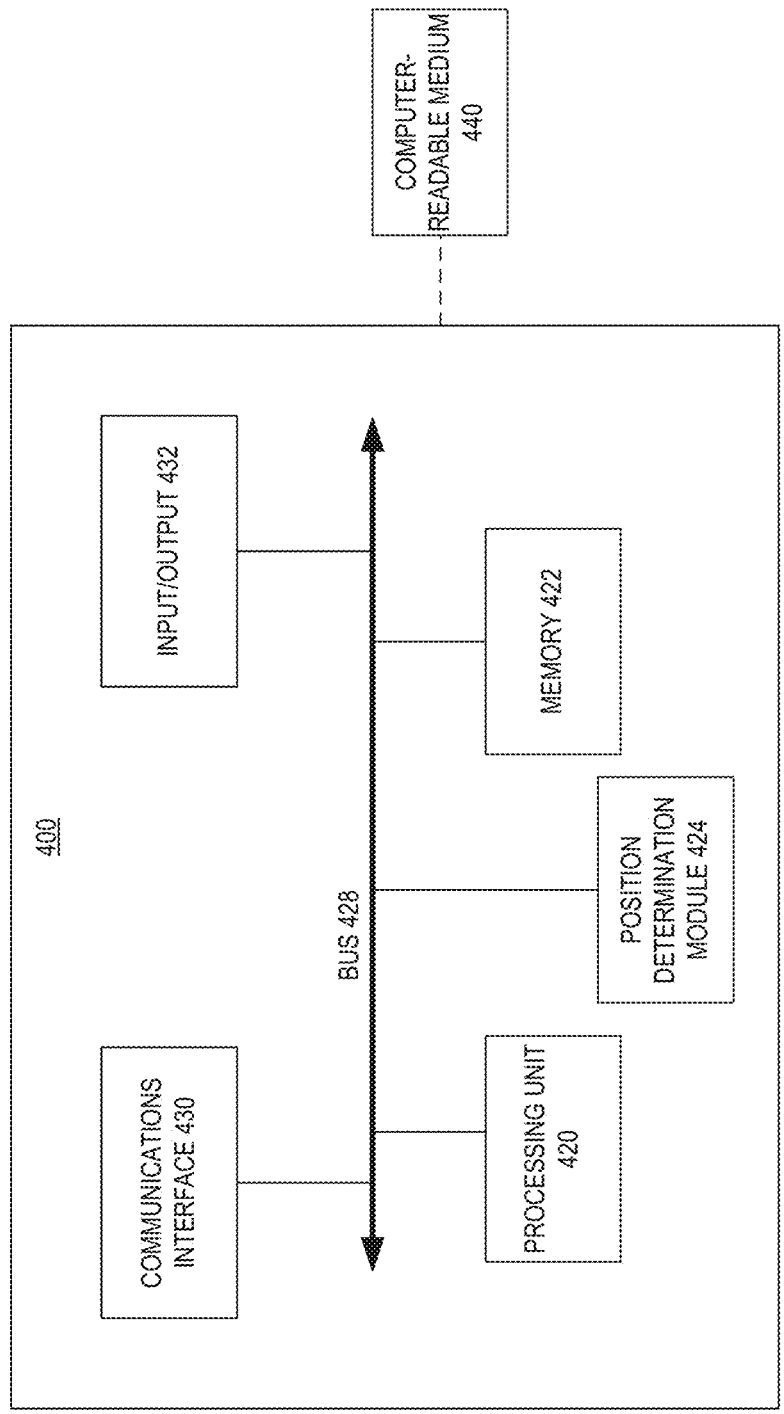
FIG. 4 is a functional block diagram of a location server.

FIG. 4 is a functional block diagram of a location server 400 configurable to implement techniques and/or processes described above. For example, location server 400 may be configured to perform any of the processes described in connection with processes 200, 210, 212', and 232' of FIGS. 2A-2C. In particular, location server 400 includes a position determination module (PDM) 424. PDM 424 provides position determination services for a mobile subscriber. Based on hybrid location technology, the PDM may combine wireless assisted Global Positioning System (GPS) and network-based ranging technologies in an exchange of information with mobile devices in a wireless communication network. PDM 424 is then able to determine the location of subscribing mobile devices, or assist them in determining their own location by generating and sending assistance data.

Location server 400 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

It is recognized that all or part of the various devices and networks shown in location server 400, and the processes and methods as further described herein, may be implemented using or otherwise including hardware, firmware, software, or any combination thereof.

Thus, by way of example but not limitation, location server 400 may include at least one processing unit 420 that is operatively coupled to a memory 422 through a bus 428. Processing unit 420 is representative of one or more circuits configurable to perform at least a portion of a data computing procedure or process. By way of example but not limitation, processing unit 420 may include one or more processors, controllers, microprocessors, microcontrollers, application specific integrated circuits, digital signal processors, programmable logic devices, field programmable gate arrays, and the like, or any combination thereof. In one embodiment, processing unit 420 alone, or in combination with PDM 424, is configured to generate assistance data as described above.

Memory 422 is representative of any data storage mechanism. Memory 422 may include, for example, a random access memory, read only memory, etc. While illustrated in this example as being separate from processing unit 420, it should be understood that all or part of memory 422 may be provided within or otherwise co-located/coupled with processing unit 420.

Memory 422 may also include, for example, one or more data storage devices or systems, such as, for example, a disk drive, an optical disc drive, a tape drive, a solid state memory drive, etc. In certain implementations, memory 422 may be operatively receptive of, or otherwise configurable to couple to, a computer-readable medium 440. Computer-readable medium 440 may include, for example, any medium that can carry and/or make accessible data, code and/or instructions for location server 400. Computer readable medium 440 may also be referred to as a storage medium.

By way of example but not limitation, communication interface 430 may include a network interface device or card, a modem, a router, a switch, a transceiver, and the like. Location server 400 may further include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 432 may include an operatively configured display, speaker, keyboard, mouse, trackball, touch screen, data port, etc.

The teachings herein may be incorporated into (e.g., implemented within or performed by) a variety of apparatuses (e.g., devices). For example, one or more aspects taught herein may be incorporated into a mobile station, phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Various modifications to the embodiments disclosed herein will be readily apparent to those skilled in the art, and the generic principles defined herein may be applied to other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. A method for assisting a mobile device to perform positioning measurements on positioning signals periodically transmitted by at least some of a plurality of cells in a wireless communication network, the method comprising:
   determining an estimated position of the mobile device;

determining a first set of candidate cells of the plurality of cells in the wireless communication network based on the estimated position of the mobile device;
estimating an expected interference of each respective positioning signal that is transmitted by each candidate cell of the first set caused, at least in part, by transmission of signals by one or more other cells of the plurality of cells;
selecting a subset of cells from the first set of candidate cells based on the estimated expected interference;
generating assistance data that identifies the selected subset of cells; and
sending the generated assistance data to the mobile device.

2. The method of claim 1, wherein determining an estimated position of the mobile device includes:
determining which of the plurality of cells is a serving cell of the mobile device; and
setting the estimated position of the mobile device to a center of the serving cell.

3. The method of claim 2, wherein determining the estimated position of the mobile device further includes:
scaling a maximum antenna range of a base station included in the serving cell according to a relative power level of the base station; and
setting the estimated position of the mobile device to a center of the serving cell based on the scaled maximum antenna range.

4. The method of claim 1, wherein determining the estimated position of the mobile device is based on a relative power level of each base station included in at least some of the plurality of cells.

5. The method of claim 1, wherein determining the first set of candidate cells includes:
determining whether a distance between the estimated position of the mobile device and each base station included in at least some of the plurality of cells is within a threshold distance and whether the estimated position of the mobile device is within a maximum antenna range of the respective base station; and if so, adding the respective cell to the first set of candidate cells.

6. The method of claim 1, wherein estimating the expected interference of each respective positioning signal that is transmitted by each candidate cell of the first set includes estimating a threshold sensitivity at multiple serving power levels associated with various locations within the candidate cell.

7. The method of claim 1, wherein estimating the expected interference of each respective positioning signal that is transmitted by each candidate cell of the first set includes:
determining which of the candidate cells is a serving cell of the mobile device;
determining a transmit frequency of the positioning signal transmitted by the serving cell; and
setting a threshold sensitivity to below a power level of the serving cell for each candidate cell of the first set having a transmit frequency that is the same as the transmit frequency of the serving cell.

8. The method of claim 1, wherein selecting the subset of cells from the first set of candidate cells includes:
estimating a link margin at multiple locations within each candidate cell based on the estimated interference of each respective candidate cell;
estimating a probability of availability of the positioning signal for each candidate cell in response to the estimated link margin;
estimating a probability of ambiguity of the positioning signal for each candidate cell;
scoring each candidate cell in the first set based on the estimated probability of availability and the estimated probability of ambiguity; and
adding those candidate cells from the first set that have the highest scores to the subset of cells.

9. A non-transitory computer-readable medium including program code stored thereon for assisting a mobile device to perform positioning measurements on positioning signals periodically transmitted by at least some of a plurality of cells in a wireless communication network, the program code comprising instructions to:
determine an estimated position of the mobile device;
determine a first set of candidate cells of the plurality of cells in the wireless communication network based on the estimated position of the mobile device;
estimate an expected interference of each respective positioning signal that is transmitted by each candidate cell of the first set caused, at least in part, by transmission of signals by one or more other cells of the plurality of cells;
select a subset of cells from the first set of candidate cells based on the estimated expected interference;
generate assistance data that identifies the selected subset of cells; and
send the generated assistance data to the mobile device.

10. The medium of claim 9, wherein the instructions to determine an estimated position of the mobile device includes instructions to:
determine which of the plurality of cells is a serving cell of the mobile device;
set the estimated position of the mobile device to a center of the serving cell;
scale a maximum antenna range of a base station included in the serving cell according to a relative power level of the base station; and
set the estimated position of the mobile device to a center of the serving cell based on the scaled maximum antenna range.

11. The medium of claim 9, wherein the instructions to estimate the expected interference of each respective positioning signal that is transmitted by each candidate cell of the first set includes instructions to estimate a threshold sensitivity at multiple serving power levels associated with various locations within the candidate cell.

12. The medium of claim 9, wherein the instructions to estimate the expected interference of each respective positioning signal that is transmitted by each candidate cell of the first set includes instructions to:
determine which of the candidate cells is a serving cell of the mobile device;
determine a transmit frequency of the positioning signal transmitted by the serving cell; and
set a threshold sensitivity to below a power level of the serving cell for each candidate cell of the first set having a transmit frequency that is the same as the transmit frequency of the serving cell.

13. The medium of claim 9, wherein the instructions to select the subset of cells from the first set of candidate cells includes instructions to:
estimate a link margin at multiple locations within each candidate cell based on the estimated interference of each respective candidate cell;
estimate a probability of availability of the positioning signal for each candidate cell in response to the estimated link margin;

estimate a probability of ambiguity of the positioning signal for each candidate cell;
score each candidate cell in the first set based on the estimated probability of availability and the estimated probability of ambiguity; and
add those candidate cells from the first set that have the highest scores to the subset of cells.

14. An apparatus for assisting a mobile device to perform positioning measurements on positioning signals periodically transmitted by at least some of a plurality of cells in a wireless communication network, the apparatus comprising:
memory adapted to store program code; and
a processing unit coupled to the memory to access and execute instructions included in the program code to direct the apparatus to:
determine an estimated position of the mobile device;
determine a first set of candidate cells of the plurality of cells in the wireless communication network based on the estimated position of the mobile device;
estimate an expected interference of each respective positioning signal that is transmitted by each candidate cell of the first set caused, at least in part, by transmission of signals by one or more other cells of the plurality of cells;
select a subset of cells from the first set of candidate cells based on the estimated expected interference;
generate assistance data that identifies the selected subset of cells; and
send the generated assistance data to the mobile device.

15. The apparatus of claim 14, wherein the instructions to determine an estimated position of the mobile device includes instructions to:
determine which of the plurality of cells is a serving cell of the mobile device;
set the estimated position of the mobile device to a center of the serving cell;
scale a maximum antenna range of a base station included in the serving cell according to a relative power level of the base station; and
set the estimated position of the mobile device to a center of the serving cell based on the scaled maximum antenna range.

16. The apparatus of claim 14, wherein determining the estimated position of the mobile device is based on a relative power level of each base station included in at least some of the plurality of cells.

17. The apparatus of claim 14, wherein the instructions to determine the first set of candidate cells includes instructions to:
determine whether a distance between the estimated position of the mobile device and each base station included in at least some of the plurality of cells is within a threshold distance and whether the estimated position of the mobile device is within a maximum antenna range of the respective base station; and if so,
add the respective cell to the first set of candidate cells.

18. The apparatus of claim 14, wherein the instructions to estimate the expected interference of each respective positioning signal that is transmitted by each candidate cell of the first set includes instructions to estimate a threshold sensitivity at multiple serving power levels associated with various locations within the candidate cell.

19. The apparatus of claim 14, wherein the instructions to estimate the expected interference of each respective positioning signal that is transmitted by each candidate cell of the first set includes instructions to:
determine which of the candidate cells is a serving cell of the mobile device;
determine a transmit frequency of the positioning signal transmitted by the serving cell; and
set a threshold sensitivity to below a power level of the serving cell for each candidate cell of the first set having a transmit frequency that is the same as the transmit frequency of the serving cell.

20. The apparatus of claim 14, wherein the instructions to select the subset of cells from the first set of candidate cells includes instructions to:
estimate a link margin at multiple locations within each candidate cell based on the estimated interference of each respective candidate cell;
estimate a probability of availability of the positioning signal for each candidate cell in response to the estimated link margin;
estimate a probability of ambiguity of the positioning signal for each candidate cell;
score each candidate cell in the first set based on the estimated probability of availability and the estimated probability of ambiguity; and
add those candidate cells from the first set that have the highest scores to the subset of cells.

21. A location server for use with a Long Term Evolution (LTE) wireless communication system, the location server comprising:
memory adapted to store program code; and
a processing unit coupled to the memory to access and execute instructions included in the program code to direct the location server to:
receive a request for assistance data from the mobile device via a serving cell of a plurality of cells included in the LTE wireless communication system, wherein each cell of the plurality of cells is configured to periodically transmit a Position Reference Signal (PRS) for Observed Time Difference Of Arrival (OTDOA) positioning of a mobile device within the LTE wireless communication system;
determine an estimated position of the mobile device in response to receiving the request for assistance data;
determine a first set of candidate cells of the plurality of cells in the LTE wireless communication network based on the estimated position of the mobile device;
estimate an expected interference of each respective Position Reference Signal that is transmitted by each candidate cell of the first set caused, at least in part, by transmission of signals by one or more other cells of the plurality of cells;
select a subset of cells from the first set of candidate cells based on the estimated expected interference;
generate the assistance data that includes a Physical Cell ID (PCI) for each cell included in the selected subset of cells; and
send the generated assistance data to the mobile device.

22. The location server of claim 21, wherein the processing unit of the location server is further configured to:
estimate a link margin at multiple locations within each candidate cell based on the estimated interference of each respective candidate cell;
estimate a probability of availability of the Position Reference Signal for each candidate cell in response to the estimated link margin;
estimate a probability of ambiguity of the Position Reference Signal for each candidate cell;

score each candidate cell in the first set based on the estimated probability of availability and the estimated probability of ambiguity; and add those candidate cells from the first set that have the highest scores to the subset of cells.

23. The location server of claim 21, wherein the instructions to determine the first set of candidate cells includes instructions to:

determine whether a distance between the estimated position of the mobile device and each base station included in at least some of the plurality of cells is within a threshold distance and whether the estimated position of the mobile device is within a maximum antenna range of the respective base station; and if so, add the respective cell to the first set of candidate cells.

24. The location server of claim 21, wherein the instructions to estimate the expected interference of each respective Position Reference Signal that is transmitted by each candidate cell of the first set includes instructions to estimate a threshold sensitivity at multiple serving power levels associated with various locations within the candidate cell.

25. The location server of claim 21, wherein the instructions to estimate the expected interference of each respective Position Reference Signal that is transmitted by each candidate cell of the first set includes instructions to:

determine which of the candidate cells is a serving cell of the mobile device;

determine a transmit frequency of the Position Reference Signal transmitted by the serving cell; and set a threshold sensitivity to below a power level of the serving cell for each candidate cell of the first set having a transmit frequency that is the same as the transmit frequency of the serving cell.

* * * * *